(12) United States Patent
Srinivasa Murthy

(10) Patent No.: US 10,982,783 B2
(45) Date of Patent: Apr. 20, 2021

(54) VARIABLE FLOW CONTROLLED DIAPHRAGM VALVE BASED ON SHAPE MEMORY ALLOY

(71) Applicant: Hamilton Sundstrand Corporation, Charlotte, NC (US)

(72) Inventor: Vinay Kumar Srinivasa Murthy, Karnataka (IN)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 19 days.

(21) Appl. No.: 16/352,603

(22) Filed: Mar. 13, 2019

(65) Prior Publication Data

US 2020/0132208 A1 Apr. 30, 2020

(30) Foreign Application Priority Data

Oct. 30, 2018 (IN) .............................. 201811040936

(51) Int. Cl.
*F16K 31/02* (2006.01)
*F16K 7/12* (2006.01)
*F16K 31/00* (2006.01)

(52) U.S. Cl.
CPC ............ *F16K 31/025* (2013.01); *F16K 7/126* (2013.01); *F16K 7/12* (2013.01); *F16K 31/002* (2013.01)

(58) Field of Classification Search
CPC ...... F16K 7/126; F16K 31/025; F16K 31/002; F16K 7/12; F03G 7/065; F03G 7/06
See application file for complete search history.

(56) References Cited

U.S. PATENT DOCUMENTS

| | | | | |
|---|---|---|---|---|
| 1,070,027 A * | 8/1913 | Pitts | ...................... | F16K 31/025 251/11 |
| 2,960,303 A * | 11/1960 | Smallpeice | ........... | F16K 31/025 251/11 |
| 3,215,396 A * | 11/1965 | Bergsma | ............... | F16K 31/025 251/11 |
| 4,209,989 A * | 7/1980 | Andresen | ................... | F03G 7/06 60/527 |
| 4,846,215 A * | 7/1989 | Barree | ....................... | F16K 7/17 137/510 |

(Continued)

FOREIGN PATENT DOCUMENTS

| JP | 2006125445 A | 5/2006 |
|---|---|---|
| JP | 2007078028 A | 3/2007 |

OTHER PUBLICATIONS

European Search Report Application No. EP19206150; dated Mar. 18, 2020; pp. 8.

*Primary Examiner* — Umashankar Venkatesan
(74) *Attorney, Agent, or Firm* — Cantor Colburn LLP

(57) ABSTRACT

A valve is provided and includes a valve body defining a pathway, a diaphragm and a wire. The diaphragm is configured to assume first or second conditions in which the diaphragm blocks or permits fluid flow through the pathway, respectively. The diaphragm is biased toward assumption of the first condition. The wire is coupled to the diaphragm. The wire has an uncontracted length in an unheated state whereby the wire permits assumption of the first condition by the diaphragm due to the bias and a contracted length in a heated state whereby the wire pulls the diaphragm toward assumption of the second condition in opposition to the bias.

19 Claims, 6 Drawing Sheets

(56) References Cited

U.S. PATENT DOCUMENTS

| | | | |
|---|---|---|---|
| 4,973,024 A * | 11/1990 | Homma | F16K 31/002 |
| | | | 137/594 |
| 5,325,880 A | 5/1994 | Johnson et al. | |
| 6,279,859 B2 | 8/2001 | West et al. | |
| 6,279,869 B1 * | 8/2001 | Olewicz | F16K 7/045 |
| | | | 251/11 |
| 6,464,200 B1 | 10/2002 | Hines et al. | |
| 7,971,651 B2 | 7/2011 | Tanju et al. | |
| 2003/0116737 A1 | 6/2003 | Jang | |
| 2007/0200081 A1 * | 8/2007 | Elizarov | F16K 99/0001 |
| | | | 251/331 |
| 2010/0108922 A1 | 5/2010 | Foshansky | |
| 2014/0339265 A1 * | 11/2014 | Marone | A47L 15/4409 |
| | | | 337/140 |
| 2019/0003609 A1 * | 1/2019 | Asai | F16K 7/16 |

\* cited by examiner

VARIABLE FLOW CONTROLLED DIAPHRAGM VALVE BASED ON SHAPE MEMORY ALLOY

CROSS-REFERENCE TO RELATED APPLICATIONS

This application claims the benefit of Indian Patent Application No. 201811040936, filed Oct. 30, 2018, which is incorporated herein by reference in its entirety.

BACKGROUND

The following description relates to valves and, more particularly, to a variable flow control diaphragm valve that is operated based on a response of a shape memory alloy.

Variable flow valves are commonly used in multiple technologies and applications. They are often reliant upon the operation of a solenoid element, which is activated or deactivated in order to move a diaphragm between open and closed positions.

It has been found, however, that variable flow valves that rely upon solenoid elements exhibit operational drawbacks. These include, but are not limited to, the fact that solenoids require complex electronics and can be negatively affected by electro-magnetic fields or interference and are also susceptible to dust and moisture infiltration that can degrade performance.

BRIEF DESCRIPTION

According to one aspect of the disclosure, a valve is provided and includes a valve body defining a pathway, a diaphragm and a wire. The diaphragm is configured to assume first or second conditions in which the diaphragm blocks or permits fluid flow through the pathway, respectively. The diaphragm is biased toward assumption of the first condition. The wire is coupled to the diaphragm. The wire has an uncontracted length in an unheated state whereby the wire permits assumption of the first condition by the diaphragm due to the bias and a contracted length in a heated state whereby the wire pulls the diaphragm toward assumption of the second condition in opposition to the bias.

In accordance with additional or alternative embodiments, the valve body defines the pathway and an aperture open to the pathway, the diaphragm is coupled to the valve body at the aperture and the pathway includes a curved inlet portion, a curved outlet portion and a central portion traversable by the diaphragm in which the curved inlet and outlet portions meet.

In accordance with additional or alternative embodiments, an elastic element is configured to apply the bias to the diaphragm or the diaphragm has an elastic characteristic from which the bias arises.

In accordance with additional or alternative embodiments, the wire includes shape memory alloy.

In accordance with additional or alternative embodiments, a difference between the uncontracted and contracted lengths is about 3-4% of the uncontracted length.

In accordance with additional or alternative embodiments, circuitry is operably coupled to the wire and configured to cause the wire to be in one of the unheated and the unheated states.

In accordance with additional or alternative embodiments, the circuitry includes a switch configured to assume open or closed conditions such that the wire is caused to be in the unheated or the heated states, respectively.

In accordance with additional or alternative embodiments, the circuitry includes first and second pulse width modulation (PWM) signals in series.

In accordance with another aspect of the disclosure, a valve is provided and includes a first body, a second body defining a pathway and an aperture, a diaphragm and a wire. The diaphragm is coupled to the second body at the aperture and is configured to assume first or second conditions in which the diaphragm blocks or permits fluid flow through the pathway, respectively. The diaphragm is biased toward assumption of the first condition. The wire is coupled to the first body and the diaphragm. The wire includes shape memory alloy and has an uncontracted length in an unheated state whereby the wire permits assumption of the first condition by the diaphragm due to the bias and a contracted length in a heated state whereby the wire pulls the diaphragm toward assumption of the second condition in opposition to the bias.

In accordance with additional or alternative embodiments, pulleys are disposed within the first body and the wire extends about the pulleys.

In accordance with additional or alternative embodiments, the pulleys are arranged in a staggered formation.

In accordance with additional or alternative embodiments, the second body defines the aperture to be open to the pathway, the diaphragm is coupled to the valve body at the aperture and the pathway includes a curved inlet portion, a curved outlet portion and a central portion traversable by the diaphragm in which the curved inlet and outlet portions meet.

In accordance with additional or alternative embodiments, an elastic element is configured to apply the bias to the diaphragm or the diaphragm has an elastic characteristic from which the bias arises.

In accordance with additional or alternative embodiments, the wire comprises shape memory alloy.

In accordance with additional or alternative embodiments, a difference between the uncontracted and contracted lengths is about 3-4% of the uncontracted length.

In accordance with additional or alternative embodiments, circuitry is operably coupled to the wire and configured to cause the wire to be in one of the unheated and the unheated states.

In accordance with additional or alternative embodiments, the circuitry is partially supported in the first body.

In accordance with additional or alternative embodiments, the circuitry includes a switch configured to assume open or closed conditions such that the wire is caused to be in the unheated or the heated states, respectively.

In accordance with additional or alternative embodiments, the circuitry includes first and second pulse width modulation (PWM) signals in series.

According to yet another aspect of the disclosure, a method of operating a valve in which a diaphragm blocks or permits fluid flow through a pathway, the diaphragm is biased toward permitting the fluid flow and a shape memory alloy wire is coupled to the diaphragm and has an uncontracted length in an unheated state whereby the wire permits the diaphragm to permit the fluid flow due to the bias and a contracted length in a heated state whereby the wire pulls the diaphragm toward blocking the fluid flow in opposition to the bias is provided. The method includes generating a first signal which causes the wire to be placed in the unheated state and generating a second signal which causes the wire to be placed in the heated state.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

Figure 1:
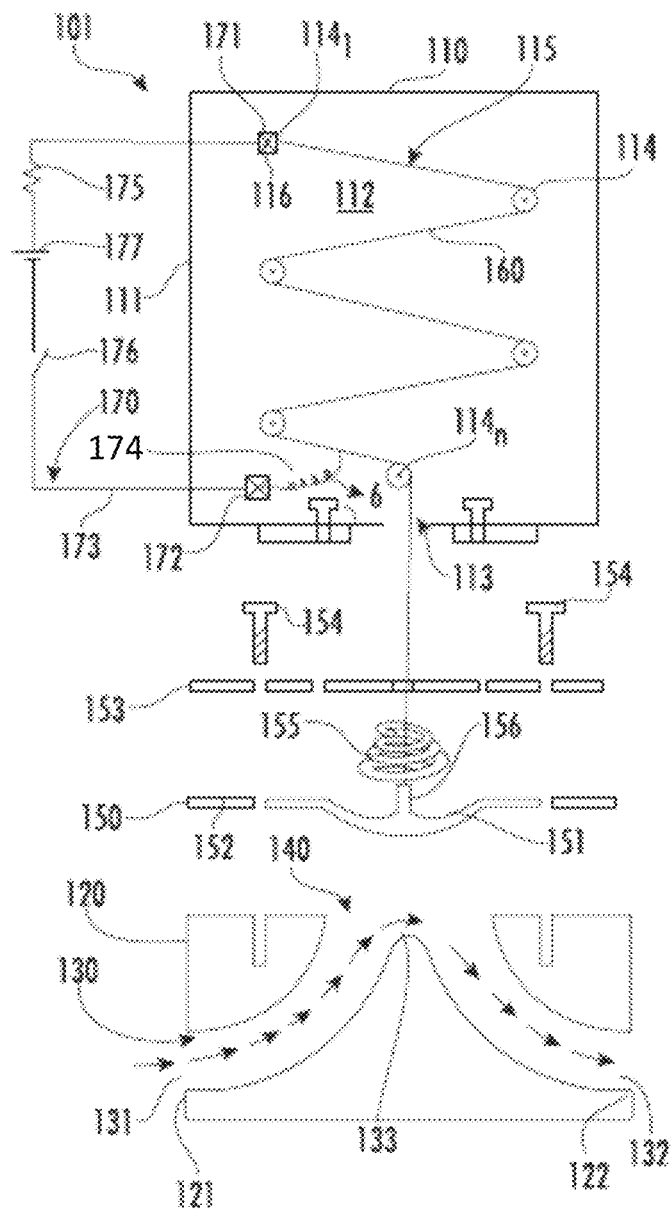
FIG. 1 is an exploded front view of a valve in accordance with embodiments.
Figure 2:
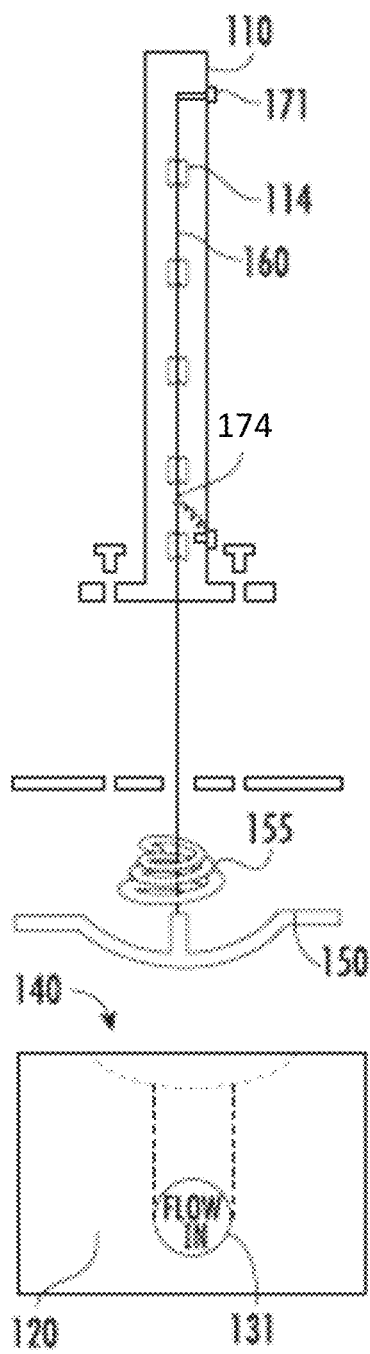
FIG. 2 is an exploded side view of the valve of FIG. 1.

These and other advantages and features will become more apparent from the following description taken in conjunction with the drawings.

DETAILED DESCRIPTION

As will be described below, a variable flow control valve is provided and employs shape memory alloy to control operations of a diaphragm.

With reference to FIGS. 1-4, a valve 101 is provided. The valve 101 includes a wire housing or first body 110 and a valve or second body 120.

The first body 110 includes sidewalls 111 that are formed to define a generally empty interior 112 with an opening 113 and includes pulleys 114. The pulleys 114 can be distributed throughout the interior 112 and can be independently rotatable. In accordance with embodiments, the pulleys 114 can be disposed in a staggered formation 115. Of the pulleys 114, a first pulley $114_1$ can be provided as a terminal block 116 and a final pulley $114_n$ can be provided proximate to the opening 113.

The second body 120 is formed to define a pathway 130 and an aperture 140, which is open to the pathway 130. The pathway 130 has an inlet portion 131 that curvi-linearly extends into and through an interior of the second body 120 from a first side 121 thereof, an outlet portion 132 that curvi-linearly extends through the second body 120 and to a second side 122 thereof and a central portion 133 at which the inlet portion 131 and the outlet portion 132 meet. The central portion 133 extends through a sidewall of the second body 120 to form the aperture 140 such that the aperture 140 extends across a substantial length of the central portion 133.

The valve 101 further includes a diaphragm 150 that can be coupled to the second body 120. The diaphragm 150 includes a diaphragm section 151 and a plate section 152 surrounding the diaphragm section 151. The plate section 152 can be secured to the sidewall of the second body 120 by a plate element 153 and fasteners 154, which are extendable through the plate element 153 and into the second body 120, such that the diaphragm section 151 is positioned at the aperture 140. The diaphragm section 151 is sized to extend along and to traverse the aperture 140. In addition, the diaphragm section 151 is flexible and configured to assume a first condition or a second condition.

Figure 3:
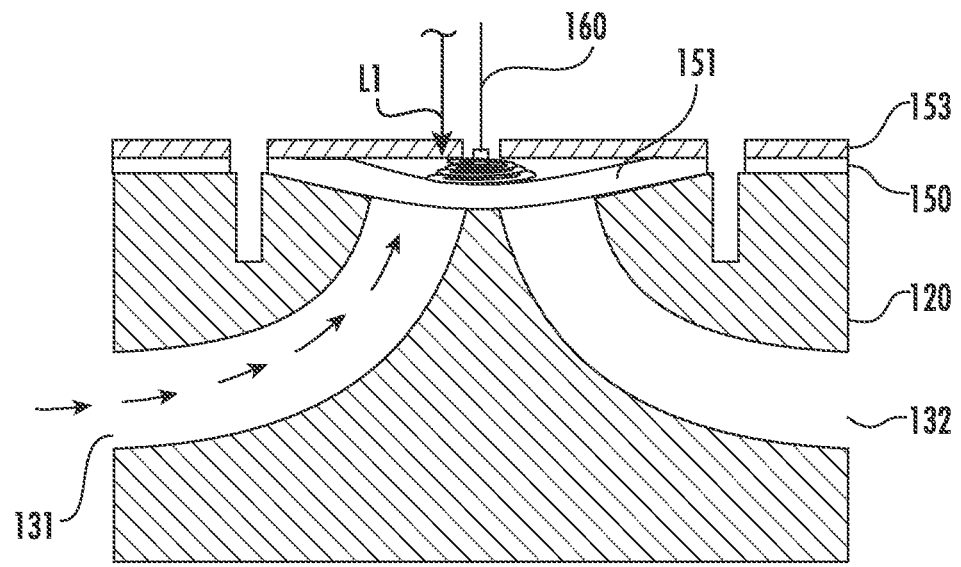
FIG. 3 is a front view of a portion of the valve of FIGS. 1 and 2 in a closed state.

As shown in FIG. 3, when the diaphragm section 151 assumes the first condition, the diaphragm section 151 abuts with the inner and outer sidewalls of the inlet portion 131 and with the inner and outer sidewalls of the outlet portion 132 to thus block fluid flow through the pathway 130.

Figure 4:
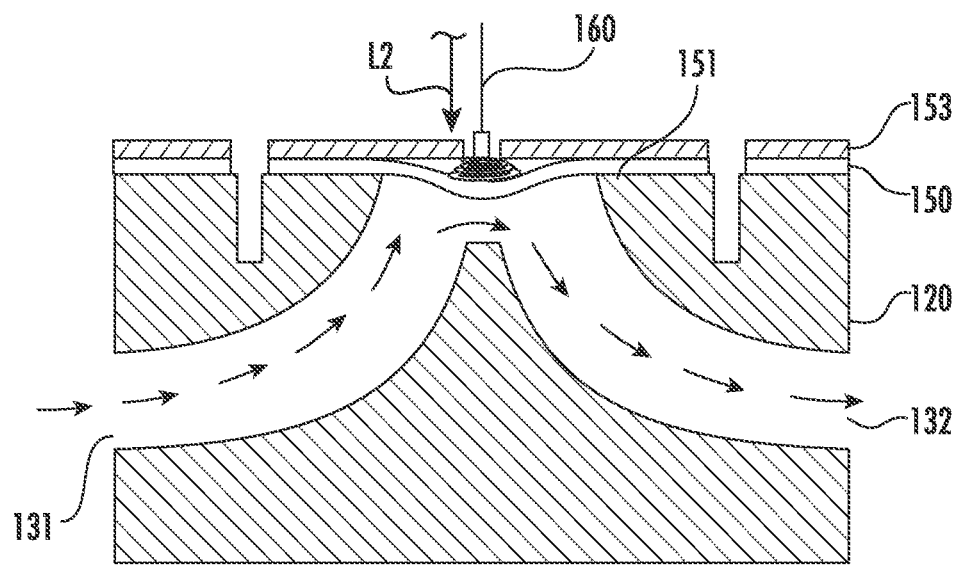
FIG. 4 is a front view of the portion of the valve in an open state.

As shown in FIG. 4, when the diaphragm section 151 assumes the second condition, the diaphragm section 151 is displaced from inner sidewalls of the inlet portion 131 and from inner sidewalls of the outlet section 132 to thus permit fluid flow through the pathway 130.

A bias can be applied to the diaphragm section 151 to urge the diaphragm section 151 to normally assume the first condition. This bias can be applied to the diaphragm section 151 by an elastic element 155, such as a compression spring, which is interposed between the diaphragm section 151 and the plate element 153. The bias can also arise from a springiness characteristic of the diaphragm section 151 itself.

The valve 101 also includes a wire 160. The wire 160 is coupled at a first end thereof to the first pulley $114_1$ in the first body 110 and at a second end thereof to a hook 156 extending from the diaphragm section 151. The wire 160 is also routed to extend around each of the pulleys 114 (in, e.g., a serpentine pathway with the pulleys 114 in the staggered formation 115) including the final pulley $114_n$ prior to extending out of the first body 110 through the opening 110. The wire 160 includes shape memory alloy that contracts when the wire 160 is heated and extends when the wire 160 is cooled. As such, the wire 160 has an uncontracted length L1 (see FIG. 3) when the wire 160 is in an unheated state and a contracted length L2 (see FIG. 4) when the wire 160 is in a heated state. When the wire 160 is in the unheated state and has the uncontracted length L1, the wire 160 permits the diaphragm section 151 to assume the first condition due to the bias applied to the diaphragm section 151. Therefore, the provision of the wire 160 in the unheated stated effectively causes the diaphragm section 151 to block fluid flow through the pathway 130. When the wire 160 is in the heated state and the contracted length L2, the wire 160 exerts a pulling force on the diaphragm section 151 and thus pulls the diaphragm section 151 toward assumption of the second condition in opposition to the bias applied to the diaphragm section 151. Therefore, the provision of the wire 160 in the heated state effectively causes the diaphragm section 151 to permit the fluid flow through the pathway 130.

The shape memory alloy of the wire 160 can include one or more of nickel and titanium (NITI) alloys, copper-zinc-aluminum (CuZnAL) alloys, copper-aluminum-nickel (CuAlNi) alloys and iron-based alloys. These and other similar shape memory alloy materials characteristically offer high work performance and provide noise-free and vibration-free motions. They also do not exhibit susceptibility to electromagnetic fields while they do exhibit corrosion resistance and offer resistance against dust or moisture.

The shape memory alloy of the wire 160 is selected such that a difference between the uncontracted length L1 and the contracted length L2 is about 3-4% of the uncontracted length L1. This being the case, the routing of the wire 160 about each of the pulleys 114 allows for a total length of the wire 160 to be increased regardless of whether the wire 160 is in the unheated or heated state. That is, the routing of the wire 160 about each of the pulleys 114 allows the uncontracted length L1 of the wire 160 to be increased and in turn provides for an increased differential between the uncontracted length L1 and the contracted length L2. This leads to a more controllable operation of the diaphragm section 151 by the contraction of the wire 160.

Figure 5:
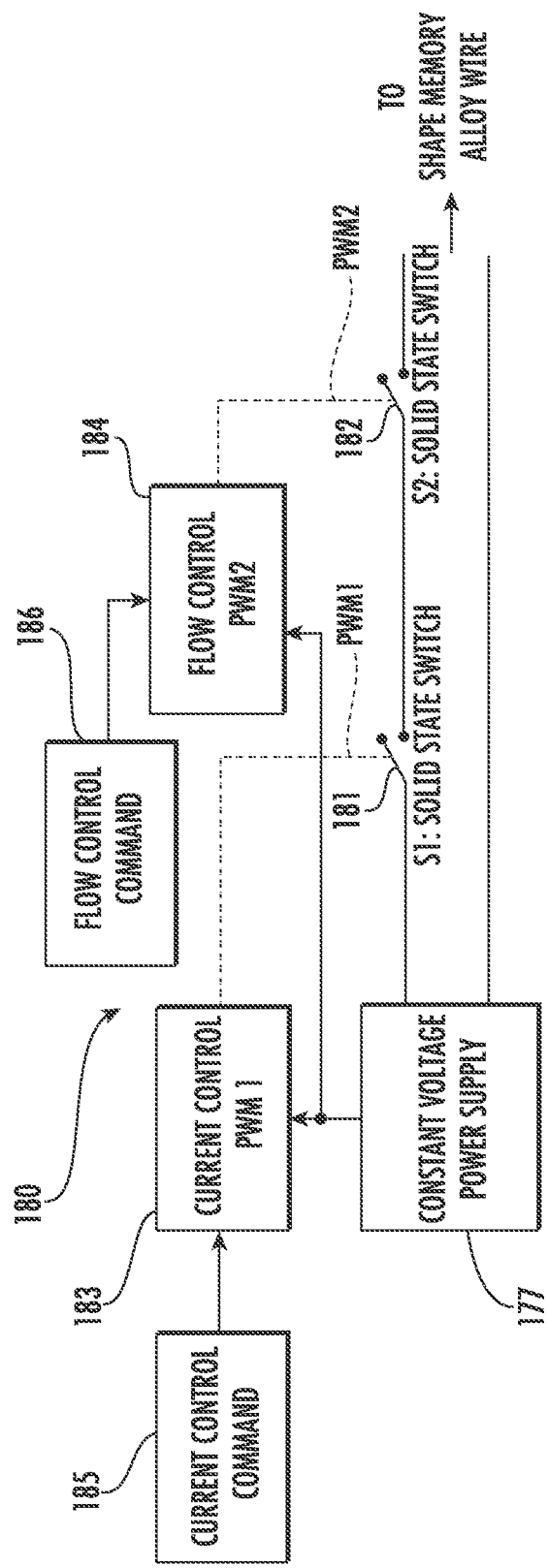
FIG. 5 is a schematic diagram illustrating circuitry to control the valve of FIGS. 1-4 in accordance with embodiments.
Figure 6:
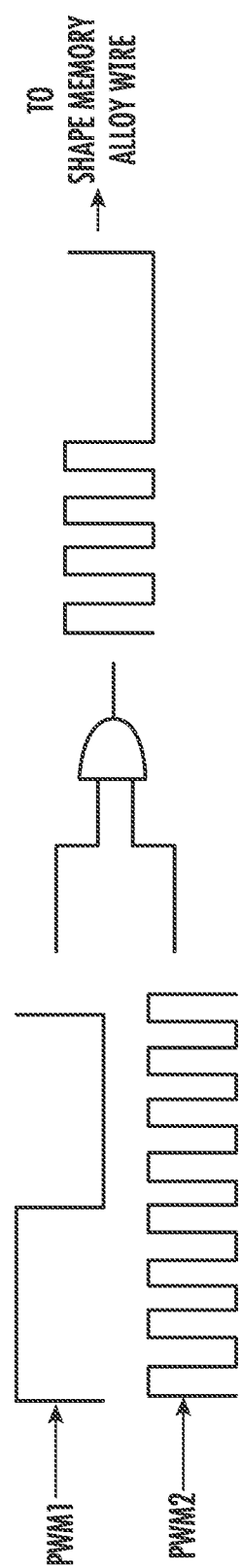
FIG. 6 is a graphical illustration of pulse width modulation (PWM) signals of the circuitry of FIG. 5.
Figure 7:
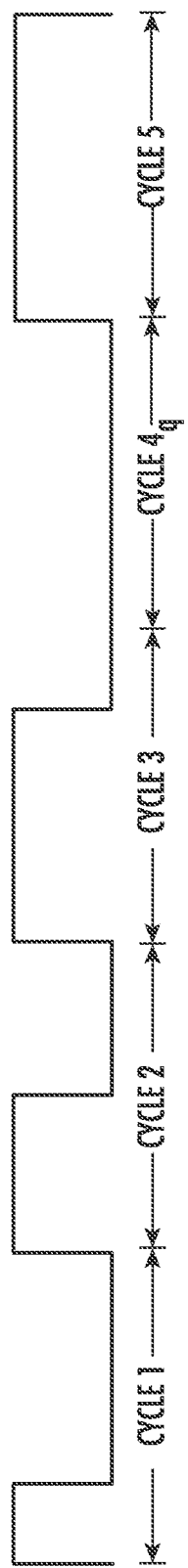
FIG. 7 is a graphical illustration of cycling of the circuitry of FIG. 5.

With continued reference to FIG. 1 and with additional reference to FIGS. 5-7, the valve 101 includes circuitry 170. The circuitry 170 is at least partially supported in the first body 110, is operably coupled to the wire 160 and is configured to cause the wire 160 to be in one of the unheated and the unheated states. The circuitry 170 includes a first terminal block 171, which may be electrically coupled with the first pulley $114_1$ and the wire 160, a second terminal block 172, wiring 173 extending between the first and second terminal blocks 171 and 172 and a conductor 174, which extends from the second terminal block 172 to the wire 160. The circuitry 170 further includes a resistive element 175, which limits current that can be carried along the wiring 173, a switch element 176 and a voltage source 177. The switch element 176 and the voltage source 177 are both disposed along the wiring 173 with the voltage source 177 disposed in series between the resistive element 175 and the switch element 176. The switch element 176 is configured to assume open or closed conditions. In the open condition, the switch element 176 prevents current from being applied to the wire 160 whereupon the wire 160 is caused to be in the unheated state. In the closed condition, the switch element 176 allows current to be applied to the wire 160 whereupon the current heats the wire 160 and the wire 160 is caused to be in the heated state.

Control of the switch element 176 can be provided by control elements 180, as shown in FIG. 5, with the switch element 176 including or being provided as first switch 181 and second switch 182 in series. The control elements include the voltage source 177, which supplies a constant voltage power supply signal to a current control unit 183 and a flow control unit 184. The current control unit 183 is receptive of this constant voltage power supply signal and a current control command signal from a potentiometer of a current control command unit 185 and is configured to generate a first pulse width modulation signal (PWM), PWM1, accordingly. The flow control unit 184 is receptive of the constant voltage power supply signal and a flow control command signal from a potentiometer of a flow control command unit 186 and is configured to generate a second PWM, PWM2, accordingly. The first and second PWMs, PWM1 and PWM 2, are employed to control the first and second switches 181 and 182, respectively.

As shown in FIG. 6, with the first and second PWMs, PWM1 and PWM 2, employed to control the first and second switches 181 and 182, respectively, the control elements 180 effectively form an AND gate in which both of the first and second switches 181 and 182 need to be in the closed condition in order for current to be applied to the wire 160.

In accordance with embodiments, the first PWM, PWM1, can be preset and can cycle on an order of 100s of micro seconds or shorter whereas the second PWM, PWM2, can be user defined and can cycle on the order of seconds.

As shown in FIG. 7, the valve 101 can be controlled to have differing flow conditions in different cycles. For example, the first and second PWMS, PWM1 and PWM2, can be generated such that the valve 101 is open for 25% of a given time in cycle 1, the first and second PWMS, PWM1 and PWM2, can be generated such that the valve 101 is open for 50% of a given time in cycle 2, the first and second PWMS, PWM1 and PWM2, can be generated such that the valve 101 is open for 75% of a given time in cycle 3, the first and second PWMS, PWM1 and PWM2, can be generated such that the valve 101 is closed for 100% of a given time in cycle 4 and the first and second PWMS, PWM1 and PWM2, can be generated such that the valve 101 is open for 100% of a given time in cycle 5.

Technical effects and benefits of the features described herein are the provision of a lightweight and quiet valve that is simple to use, easy to manufacture and applicable in many cases where there is a need for variable flow. For example, the valve can be used in fuel inerting systems in aircraft, to control hydraulic or pneumatic actuators in aircraft and in implantable/non-implantable medical applications. The valve does not require complex electronics, electro-magnetic interference (EMI) issues are reduced as compared to solenoid valves and dust or contaminations will not affects its operation.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A valve, comprising:
   a valve body defining a pathway;
   a diaphragm configured to assume first or second conditions in which the diaphragm blocks or permits fluid flow through the pathway, respectively, the diaphragm being biased toward assumption of the first condition; and
   a wire, which extends out of an opening of a first body and toward the valve body at a distance from the first body, and which comprises first and second opposed longitudinal ends and which is directly coupled at the second longitudinal end thereof to a hook of the diaphragm, the wire having an uncontracted length in an unheated state whereby the wire permits assumption of the first condition by the diaphragm due to the bias and a contracted length in a heated state whereby the wire pulls the diaphragm toward assumption of the second condition in opposition to the bias.

2. The valve according to claim 1, wherein:
   the valve body defines the pathway and an aperture open to the pathway,
   the diaphragm comprises a diaphragm section and a plate section, the plate section being secured to the valve body such that the diaphragm section is positioned at the aperture to extend along and to traverse the aperture, wherein the plate section remains in contact with the valve body when the diaphragm assumes the first and second conditions, and
   the pathway comprises a curved inlet portion, a curved outlet portion and a central portion traversable by the diaphragm section in which the curved inlet and outlet portions meet.

3. The valve according to claim 1, wherein the diaphragm has an elastic characteristic from which the bias arises.

4. The valve according to claim 1, wherein the wire comprises shape memory alloy.

5. The valve according to claim 1, wherein a difference between the uncontracted and contracted lengths is about 3-4% of the uncontracted length.

6. The valve according to claim 1, wherein:
the first longitudinal end of the wire is coupled to the first body; and
the valve further comprises circuitry partially supported in the first body and operably coupled to the wire and configured to cause the wire to be in one of the unheated and the unheated states.

7. The valve according to claim 6, wherein the circuitry comprises a switch configured to assume open or closed conditions such that the wire is caused to be in the unheated or the heated states, respectively.

8. The valve according to claim 6, wherein the circuitry comprises first and second pulse width modulation (PWM) signals in series.

9. A valve, comprising:
a first body defining an opening;
a second body at a distance from the first body and defining a pathway and an aperture;
a diaphragm comprising a hook and being coupled to the second body at the aperture and configured to assume first or second conditions in which the diaphragm blocks or permits fluid flow through the pathway, respectively, the diaphragm being biased toward assumption of the first condition; and
a wire coupled at a first longitudinal end thereof to the first body and directly coupled at a second longitudinal end thereof, which is opposite the first longitudinal end, to the hook of the diaphragm,
the wire extending out of the first body through the opening and comprising shape memory alloy and having an uncontracted length in an unheated state whereby the wire permits assumption of the first condition by the diaphragm due to the bias and a contracted length in a heated state whereby the wire pulls the diaphragm toward assumption of the second condition in opposition to the bias.

10. The valve according to claim 9, further comprising pulleys disposed within the first body and about which the wire extends.

11. The valve according to claim 10, wherein the pulleys are arranged in a staggered formation.

12. The valve according to claim 10, wherein:
the second body defines the aperture to be open to the pathway,
the diaphragm comprises a diaphragm section and a plate section, the plate section being secured to the valve body such that the diaphragm section is positioned at the aperture to extend along and to traverse the aperture, wherein the plate section remains in contact with the valve body when the diaphragm assumes the first and second conditions, and
the pathway comprises a curved inlet portion, a curved outlet portion and a central portion traversable by the diaphragm section in which the curved inlet and outlet portions meet.

13. The valve according to claim 10, wherein the diaphragm has an elastic characteristic from which the bias arises.

14. The valve according to claim 10, wherein a difference between the uncontracted and contracted lengths is about 3-4% of the uncontracted length.

15. The valve according to claim 10, further comprising circuitry operably coupled to the wire and configured to cause the wire to be in one of the unheated and the heated states.

16. The valve according to claim 15, wherein the circuitry is partially supported in the first body.

17. The valve according to claim 15, wherein the circuitry comprises a switch configured to assume open or closed conditions such that the wire is caused to be in the unheated or the heated states, respectively.

18. The valve according to claim 15, wherein the circuitry comprises first and second pulse width modulation (PWM) signals in series.

19. A method of operating a valve in which: a diaphragm blocks or permits fluid flow through a pathway, the diaphragm is biased toward blocking the fluid flow, and a shape memory alloy wire that extends out of an opening of a first body and toward a second body at a distance from the first body in which the wire is directly coupled, at a longitudinal end thereof, to a hook of the diaphragm and has an uncontracted length in an unheated state whereby the wire permits the diaphragm to block the fluid flow due to the bias and a contracted length in a heated state whereby the wire pulls the diaphragm toward permitting the fluid flow in opposition to the bias, the method comprising: generating, at circuitry partially disposed in the first body, a first signal which causes the wire to be placed in the unheated state, and generating, at the circuitry, a second signal which causes the wire to be placed in the heated state.

\* \* \* \* \*